No. 629,716. Patented July 25, 1899.
F. B. DEANE.
COMPRESSING MACHINE.
(Application filed Apr. 19, 1898.)
(No Model.) 6 Sheets—Sheet 1.

Witnesses
Sidney P. Hollingsworth

Inventor
Francis B. Deane,
by his Attorneys

No. 629,716. Patented July 25, 1899.
F. B. DEANE.
COMPRESSING MACHINE.
(Application filed Apr. 19, 1898.)
(No Model.) 6 Sheets—Sheet 3.

Witnesses
Sidney P. Hollingsworth
Arthur B. Seibold

Inventor
Francis B. Deane
by Matt W. T. Mark
Attorneys

No. 629,716. Patented July 25, 1899.
F. B. DEANE.
COMPRESSING MACHINE.
(Application filed Apr. 19, 1898.)
(No Model.) 6 Sheets—Sheet 4.

Witnesses
Inventor
Francis B. Deane,
Attorneys

No. 629,716. Patented July 25, 1899.
F. B. DEANE.
COMPRESSING MACHINE.
(Application filed Apr. 19, 1898.)
(No Model.) 6 Sheets—Sheet 5.
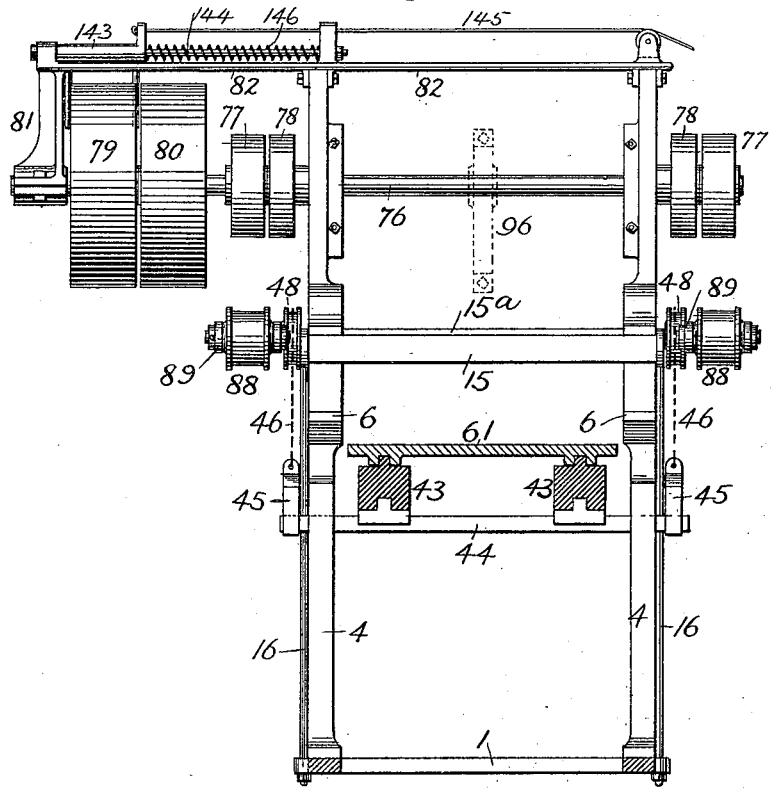
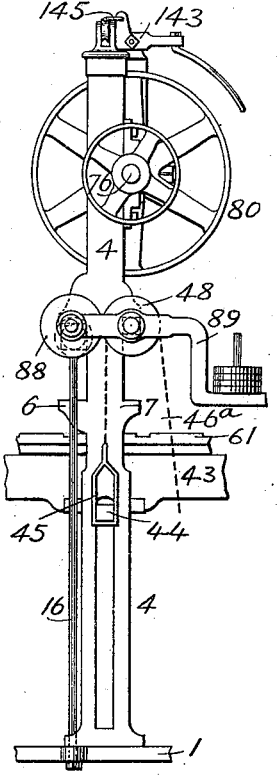
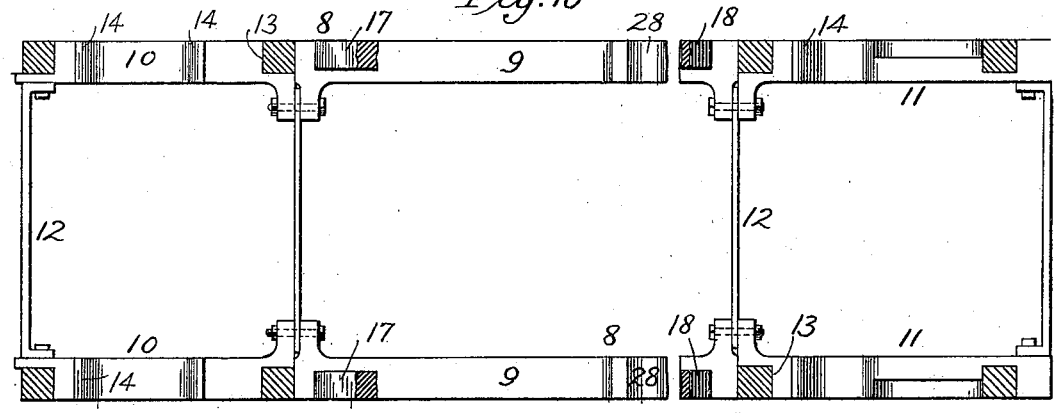

No. 629,716. Patented July 25, 1899.
F. B. DEANE.
COMPRESSING MACHINE.
(Application filed Apr. 19, 1898.)
(No Model.) 6 Sheets—Sheet 6.
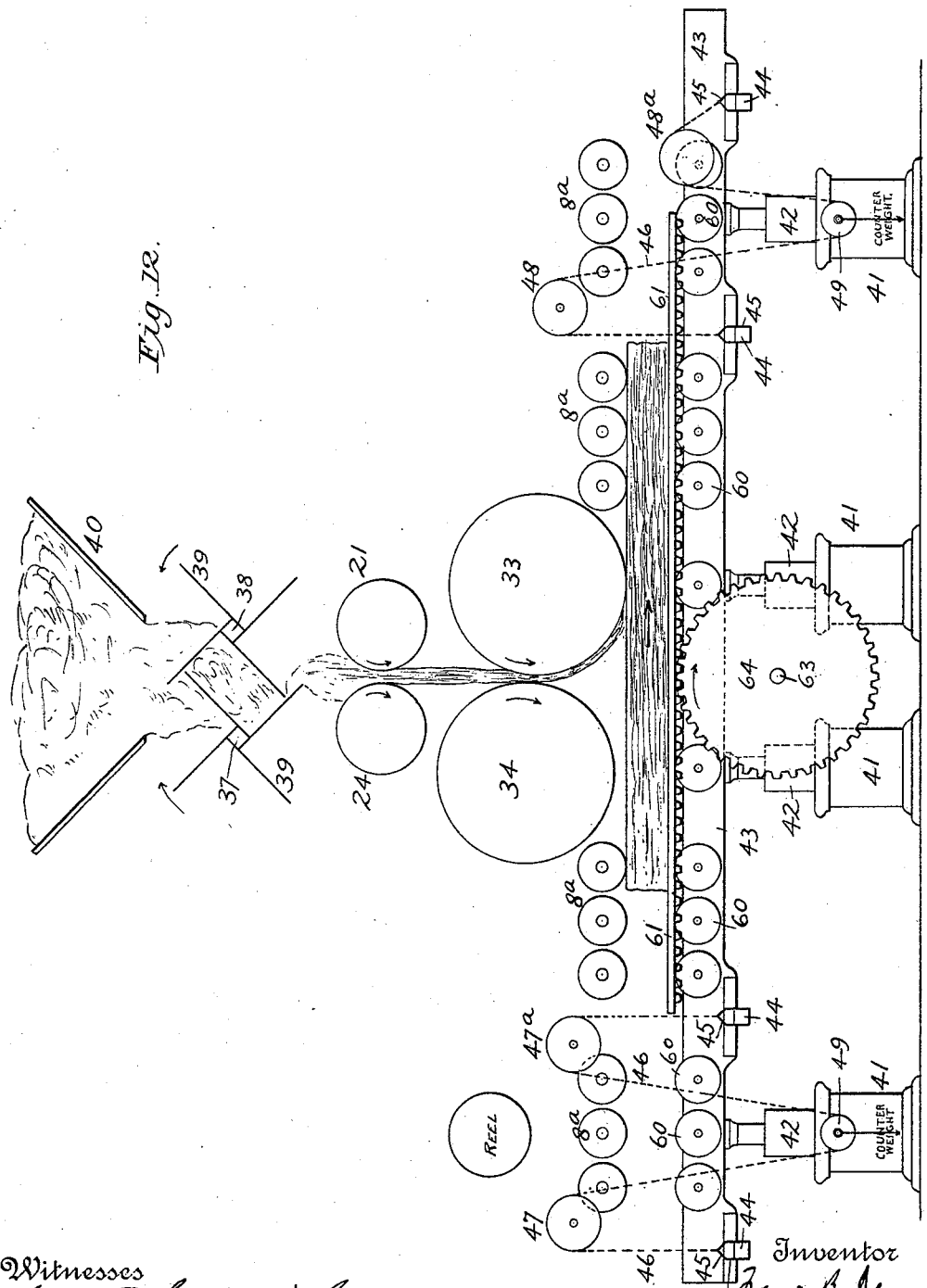

UNITED STATES PATENT OFFICE.

FRANCIS B. DEANE, OF LYNCHBURG, VIRGINIA.

COMPRESSING-MACHINE.

SPECIFICATION forming part of Letters Patent No. 629,716, dated July 25, 1899.

Application filed April 19, 1898. Serial No. 678,197. (No model.)

*To all whom it may concern:*

Be it known that I, FRANCIS B. DEANE, residing at Lynchburg, in the county of Campbell and State of Virginia, have invented certain new and useful Improvements in Compressing-Machines, of which the following is a specification, reference being had to the accompanying drawings and to the numerals of reference thereon.

My invention is more especially designed for compressing cotton and other articles adapted to be made into a "bat;" and it has for its object to provide a machine which embraces the operation of compressing and packing such articles into bales of comparatively uniform size. The machine, with this object in view, is duplicate in its construction to the extent of combining both the hydrostatic and roller features of compress construction and is so designed as to bring both features into connection the one with the other.

To this end my invention consists in the novel arrangement and combination of parts hereinafter to be fully explained in this specification and pointed out in the claims, reference being had to the accompanying drawings, in which—

Figure 1:
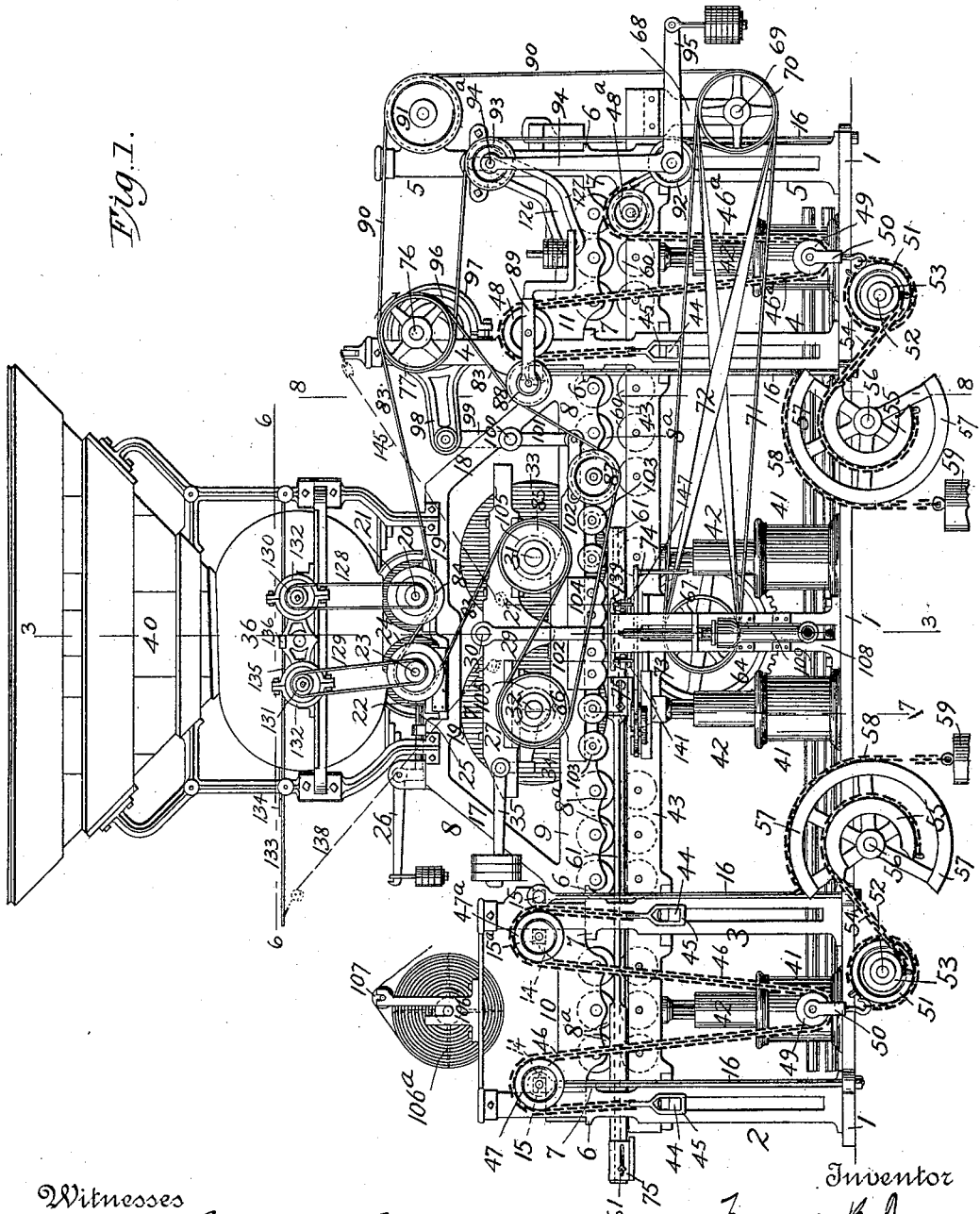
Figure 2:
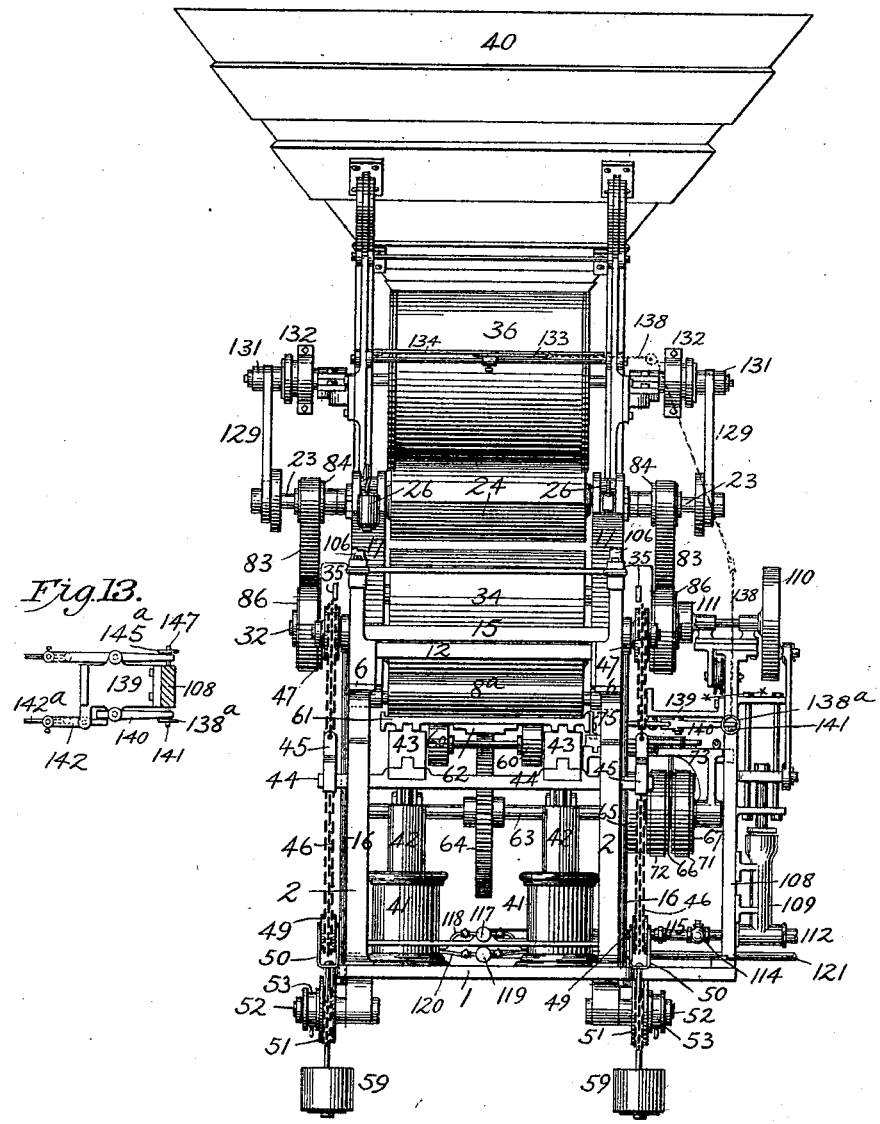
Figure 3:
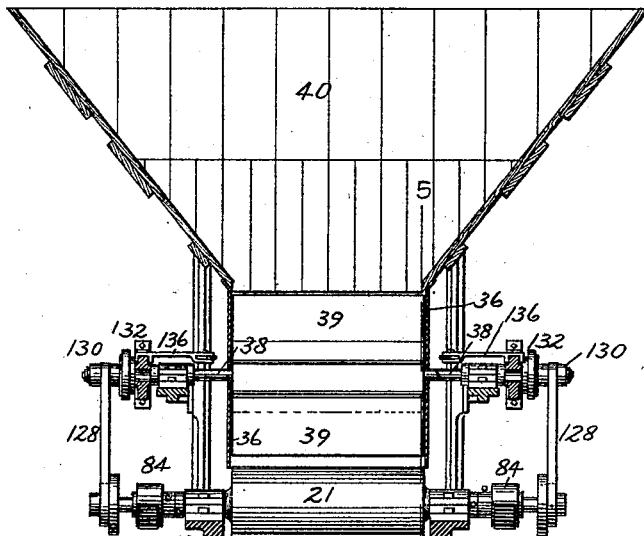
Figure 4:
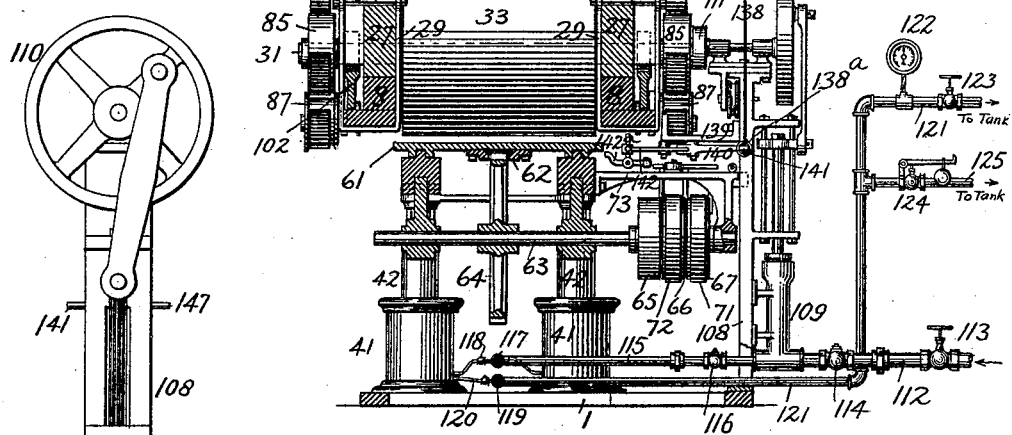
Figure 5:
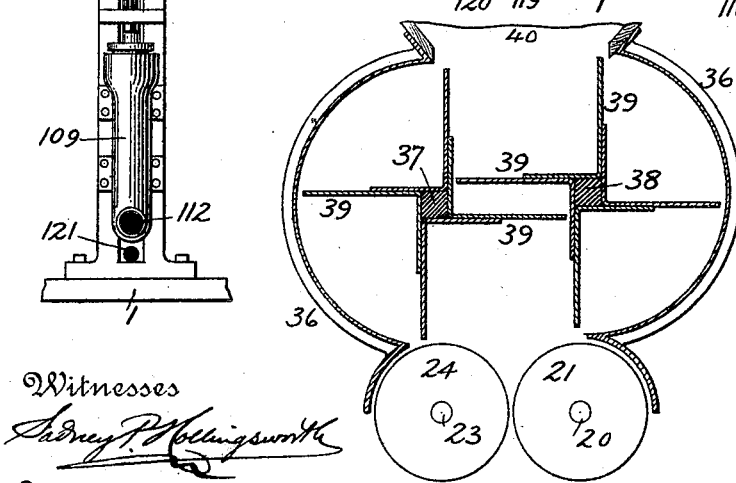
Figure 6:
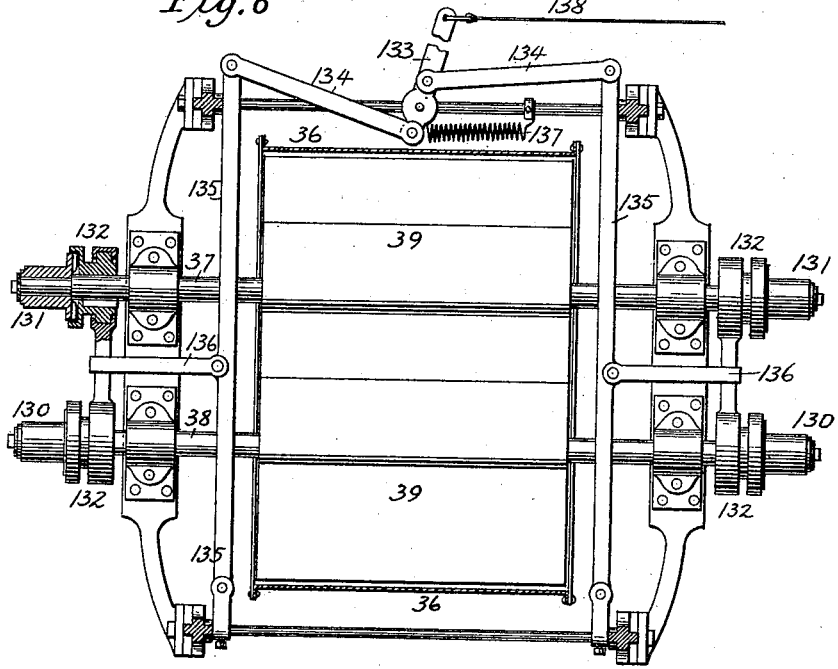
Figure 7:
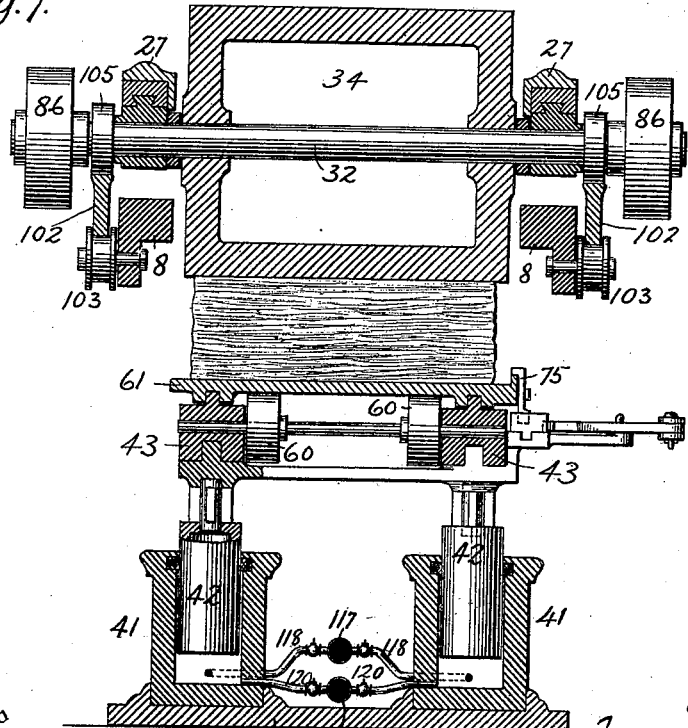

Figure 1 is a side elevation of my improved compressing-machine. Fig. 2 is an end elevation thereof. Fig. 3 is a vertical cross-section on the line 3 3, Fig. 1. Fig. 4 is an elevation of a portion of Fig. 3. Fig. 5 is a cross-section on the line 5 5, Fig. 3. Fig. 6 is a horizontal section on the line 6 6, Fig. 1. Fig. 7 is a vertical cross-section on the line 7 7 of Fig. 1. Fig. 8 is a vertical cross-section on the line 8 8, Fig. 1. Fig. 9 is a side elevation of that portion of the machine shown in Fig. 8. Fig. 10 is a plan view of the main frame. Fig. 11 is a front elevation thereof. Fig. 12 is a diagrammatic view of my machine, showing the several steps employed to compress loose cotton into bales. Fig. 13 is a detail view.

Similar numerals of reference indicate similar parts in the respective figures.

To the base 1 are bolted, at the left-hand end thereof, two upright columns 2 3 on each side of the machine. Similar columns 4 5 are bolted to the right-hand end of the base-frame, also on opposite sides thereof. Projecting from each side of each column are lugs 6 7, which support the main frame 8, which, as shown in detail in Figs. 10 and 11, consists of three parts—a central portion 9, a left-end portion 10, and a right-end portion 11. These three parts are joined by lugs and bolts, as shown, the opposite sides being connected by means of tie-plates 12, extending crosswise of the frame. The outer sides of the frame are cut away or notched, as at 13, within which the upper ends of the columns 2, 3, 4, and 5 are seated, the frame 8 resting on and being supported by the lugs 6 7. Crossing the frame 8 and resting thereon between the columns 6, 7, 8, and 9 and lugs 14 on the frame 8 are bars 15, the outer ends of which project beyond said frame and the columns and have secured to them rods 16, which extend downwardly and are bolted to the base 1. As thus constructed the bed-frame, columns, and the main frame 8 are secured together in a strong and rigid manner.

Extending upwardly from the central portion 9 of the main frame 8 on each side of the machine are inclined supports 17 18, which are connected on each side by a bar 19, to each of which is bolted a bearing for the shaft 20 of one of the primary compressing-rolls 21. Bearings 22, adapted to slide horizontally on the bars 19, support the shaft 23 of the second primary compressing-roll 24. Sliding pins 25 rest against the outer ends of the bearings 22, against which they are pressed by weighted levers 26. As thus constructed the compressing-roll 24 is held against its companion roll 21 with more or less force as the weight on the lever 26 is increased or diminished.

Pivotally supported on the central portion 9 of the frame 8, on each side of the machine, is a rocking frame 27, having a projection on its under side supported in a curved seat 28 on the frame 8. A U-shaped strap or loop 29 on each side of the machine passes around the frame 8 and each rocking frame 27, the upper ends of each loop being connected by a bolt 30, passing across the top of each rocking frame 27. Bearings secured to the under side of each rocking frame 27 support the shafts 31 32 of the secondary compressing-rolls 33 34, the bearings for the former roll being fixed, while those for the latter are made horizontally adjustable to and from the fixed bearings in order that the peripheries of the compressing-rolls 33 34 may be kept in forcible contact by means of a weighted lever 35, similar in operation to the lever 26.

Above the primary compressing-rolls 21 24 and suitably supported is a casing 36, through which pass in a horizontal direction crosswise of the machine two shafts 37 38, parallel to each other and to the shafts of the aforesaid primary compressing-rolls 21 24. To each shaft 37 38 within the casing are secured four blades 39, at right angles to each other. Above the casing and opening into its upper side is a hopper 40, the upper end of which may, if desired, open through the floor of a room into which cotton from the ginning-machine is delivered. Cotton or other fibrous or textile material having been placed in the hopper passes thence into the casing 36, where it is caught by the blades 39 on the shafts 37 38, which, rotating toward each other, will pull the material from the hopper and deliver it to the primary compressing-rolls. The blades also act as a fan to generate a suction through the hopper, which assists in drawing the material therefrom. From the blades 39 the cotton goes to the primary compressing-rolls 21 24, which compress it and form it into a bat, the amount of compression being regulated by the weighted lever 26. After passing through the rolls 21 24 the material goes next to the secondary compressing-rolls 33 34, which still further reduce its bulk and form it into a sheet ready for baling.

Supported on the base 1 are a series of hydraulic jacks or elevators 41, the cylinders of which stand in upright position, with their pistons 42 projecting from their upper ends. Four cylinders are shown on each side of the machine. This number, however, may be increased or diminished, as desired. Supported on the several pistons 42 is a frame 43 of the full length of the machine and which extends across the same between the columns 2, 3, 4, and 5 on each side of the machine. The frame 43 is adapted to be raised from its lowest position by means of the hydraulic elevators 41 and to fall by gravity or be forced downwardly, when the fluid is allowed to escape from beneath the pistons 42.

Extending transversely of the machine beneath the frame 43 are a series of bars 44, which assist in supporting and at times wholly support the said frame. The bars 44 are arranged in pairs at the right and left ends of the machine and pass through slots formed in the columns 2, 3, 4, and 5. At the left of the machine and on each side thereof the bars 44 are supported in loops 45, attached to the ends of a chain 46, which run over pulleys 47 47ª, pivoted to the ends of the bars 15 15ª, which, as before stated, rest upon the main frame 8. At the right end of the machine the bars 44 rest in loops 45, secured to the ends of a similar chain 46ª at each side of the machine, which chain passes over pulleys 48 48ª, the former being on the end of a cross-bar 15ª, journaled in brackets, as shown in Fig. 1. Within the loop of each chain hangs a pulley 49, adapted to turn in a yoke 50, on the lower end of which is a hook from which a chain passes around a pulley 51, turning upon a shaft 52. A second pulley 53, secured to each pulley 51, has connected to it a chain 54, which passes therefrom and surrounds a segment 55 on a shaft 56. A second segment connected with the segment 55, but of a greater radius, has a chain 58 secured to it at one end, a weight 59 being suspended from the chain. This description applies equally to the counterweighting mechanism at each side and each end of the machine. As thus arranged the counterweights are sufficiently heavy, or can be made so, to balance the frame 43 or even raise it from the pistons 42 of the hydraulic elevators.

Journaled on suitable pivots in the frame 43 are a series of rollers 60, which project above the top of said frame 43, the said rollers supporting a bed 61, adapted to travel thereon in a longitudinal direction from one end of the said frame to the other. To the under surface of the bed 61, in its longitudinal center, is secured a rack 62, by means of which the bed is moved backward and forward on the rollers 60.

Projecting downwardly from the center of the frame 43 are bearings in which a shaft 63 is adapted to rotate and which carries a gear-wheel 64, engaging with the rack 62. The forward end of the shaft 63, which is supported by a bracket 73, bolted to the frame 43, carries three pulleys 65, 66, and 67, the intermediate pulley 66 being fixed to the shaft, while the outer pulleys 65 67 are loose thereon.

At the extreme right of the frame 43 and depending therefrom on each side are bearings 68, which support a shaft 69, extending across the machine and carrying a pulley 70 on each end. The pulley 70 on the front side of the machine is wider on its face than the pulley on the opposite side thereof, for a purpose now to be described. Around the wide-faced pulley 70 passes a straight belt 71 and a crossed belt 72, which belts pass around two of the pulleys 65, 66, and 67. A belt-shifter 74, supported by the bracket 73 and operated by means of stops 75 on the bed 61 as it moves back and forth, shifts the belts in the usual way to cause the straight and crossed belts to alternately rotate the fixed pulley and the gear-wheel 64 in opposite directions, thereby causing the backward and forward movement of the bed 61.

The main driving-shaft 76, which is journaled in suitable bearings near the upper ends of the columns 4, extends crosswise of the machine and carries on its forward end two pulleys 77 and 78, while its rear end carries two pulleys 79 80, the pulley 79 being loose on the shaft. Beyond the pulley 79 is a bearing 81 for the end of the shaft, which bearing is supported by means of plate 82, bolted to the top of the columns 4. Between the fixed pulley 80 and the column 4 at the back of the machine are two pulleys 77 78, fixed to the shaft 76, similar to the opposite pulleys 77 78. A belt 83 on each side of the machine passes around a pulley 77, under a pulley 84 on the shaft of the primary compressing-roll 21, thence over and around a pulley on the end of the shaft 23 of the compressing-roll 24 to the pulley 85 on the end of the shaft of the secondary compressing-roll 33, whence it passes over and around the pulley 86 on the end of the shaft of the compressing-roll 34 to an idler 87, journaled to the frame 8, finally passing over a tightening-pulley 88 to the pulley 77. This arrangement of pulleys and belting is common to both sides of the machine. Each tightening-pulley 88 is pivoted in a frame 89, journaled on the end of one of the bars 15ª, the opposite end of the frame 89 carrying a weight, so that the tightening-pulley 88 will at all times keep the belt 83 tight. From each pulley 78 (on each side of the machine) a belt 90 passes over an idler 91, fixed to the top of the column 5, thence down and around pulley 70 and up over the idlers 92 93 back to the pulley 78. Each idler 93 is journaled on the long arm of a bell-crank lever 94, pivoted to the end of the bar 45, which passes through the slot in the column 5. The secondary arm 95 of the bell-crank lever has a weight hung thereon for the purpose of tightening the belt 90 and taking up all slack therein. This arrangement is also found on each side of the machine.

Power being applied to the driving-pulley 80, the shaft 76, carrying the several pulleys, will rotate in the direction shown by the arrow. This, through the medium of the belts 83, will cause the compressing-rolls to rotate toward each other. At the same time the belts 90 will drive the pulleys 70 at each side of the machine, one of which in turn drives the straight belt 71 and the cross-belt 72 on the front side of the machine, thereby rotating the pulley 66, fixed to the shaft 63, and the gear-wheel 64, also fixed to the said shaft. The rotation of the gear-wheel, as before indicated, will move the bed 61 backward and forward beneath the secondary compressing-rolls 33 34 and the smaller rollers 8ª.

Fixed to the driving-shaft 76 and intermediate of the columns 4 4 on opposite sides of the machine is an eccentric 96, surrounded by a strap in the usual manner, from which an arm 98 projects toward the compressing-rolls. Extending transversely of the machine and journaled in the inclined supports 18 is a rock-shaft 100, having an arm 99 extending upwardly and pivoted to the arm 98 of the eccentric-strap. Projecting downwardly from each end of the rock-shaft 100 is an arm 101, the lower end of each arm being connected by a link to a sliding plate 102 on each side of the machine parallel with and close to the main frame 8. The lower edge of each plate 102 is supported on rollers 103, side plates 104 being provided to retain it in position against the side of the frame 8. The upper edge of each plate is oppositely inclined at each end, which upper edge bears on rollers 105 on the shafts of the secondary compressing-rolls 33 34. By this arrangement as the shaft 76 is rotated the eccentric, through the medium of the arms 98 99, rocks the shaft 100 and by means of the arms 101 and their connecting-links causes the respective plates 102 to move longitudinally back and forth on the rollers 103. This reciprocating movement of the plates 102 rocks the frame 27 as the inclined ends of said plates engage with the rollers 105 on the shafts of the secondary compressing-rolls 33 34. The parts are so timed that the peripheral movement of the compressing-roll which is in the lower or depressed position will be in the same direction as the movement of the bed 61.

Secured in any suitable manner to the four columns 2 2 and 3 3 and located in the longitudinal center of the machine is a support 106, on which a reel of bagging material is placed. This reel consists of a hub from which pins 106ª radiate and on which is wound the bagging, cut in suitable lengths, for inclosing the bales. This bagging is of a width sufficient to cover not only the top, but the sides of the bale; but the extra width is folded on the bagging, so that when it is wound upon the reel the bagging as reeled will be only as wide as the bale. A roll 107 turns in bearings above the reel, and over it the bagging passes as it is carried to the bed 61.

When a bale is to be formed, the frame 43, which carries the bed 61, is raised to its highest position, so that the bed shall be in contact with the small rolls 8ª at the left of the machine. One end of the bagging is drawn down and connected to the bed 61 at some suitable point and the machine started, which will cause the bed to move to the right and draw from the reel the necessary bagging to form the lower covering for the bale, which drawing will cause the bagging to lie smoothly on the bed, with its sides folded under. As the bed travels backward and forward beneath the small rolls 8ª the material, which has been formed into a sheet, as heretofore described, passes from between the secondary compressing-rolls 33 34 and between the bed and that compressing-roll which is rotating in the direction in which the bed is moving. This gives the material its final compression, which is retained by the smaller rolls 8ª, journaled, as hereinbefore described, in the frame 8. As soon as the bed 61 has reached the limit of its movement the belt-shifting mechanism 74 is operated and the bed moved in the opposite direction. At the same time the eccentric 96 has caused the sliding plates 102 to travel in such direction as to tilt the frame 27, in which the secondary compressing-rolls 33 34 are journaled, and change the position of these rolls so that the roll which before was elevated is now depressed. The return movement of the bed will cause a sheet of material to be folded upon itself and another layer to be placed on the accumulating mass or bale, this layer, however, passing under the compressing-roll at this period in the lower position. This action continues until sufficient material has been compressed to form a bale, when the machine is automatically stopped through the medium of the tripping mechanism hereinafter described. A second piece of bagging will now be attached to the bed, as before, and drawn from the reel over the material, after which the machine will be operated until the transverse centers of the bale and the machine coincide, at which time the roll moving in the same direction with the bed will still be depressed and rest upon the bale. The material having a layer of the bagging beneath and above it and being held under compression between the roll 33 or 34, the small rolls 8$^a$, and the bed 61, the folded sides of the bagging will now be pulled out and with the ends sewed in the usual manner. The ties will then be placed around the bale, the frame 43 lowered by permitting the fluid to escape from the hydraulic cylinders, and the bale withdrawn.

The pressure to which the gradually-forming bale is subjected is regulated in the following manner: At the middle of the machine and on the front side thereof stands a column 108, bolted to the bed-frame 1. To this column is secured a pump 109, operated by means of a crank-wheel 110, mounted on a shaft which carries a pulley 111. This pulley 111 is driven independently of the machine, as the operation of the pump is somewhat irregular and not in harmony with the moving parts of the machine. An inlet-pipe 112, connected to one side of the pump, has a stop-valve 113 and a check-valve 114 connected therewith. From the pump a pipe 115, having an outwardly-opening check-valve 116, is fitted to a distributing-pipe 117, running lengthwise of the machine between the hydraulic elevators or jacks on each side thereof. Pipes 118, having each a check-valve, connect the distributing-pipe 117 with the series of hydraulic elevators. Beneath the distributing-pipe 117 and parallel thereto is a pipe 119, connected to the hydraulic cylinders by branches 120, each having a check-valve opening toward the pipe 119. A pipe 121 connects the pipe 119 to a tank, from which the elevator-operating fluid is drawn by the pump through the inlet-pipe 112. The pipe 121 has connected therewith a pressure-gage 122 and a stop-valve 123. A relief-valve 124 is connected to a branch 125, extending from the exhaust-pipe 121 to the tank.

In practical use the frame 43 and the bed 61 are a little heavier than the counterbalance mechanism, the object being to keep the frame 43 on the pistons 42 of the hydraulic elevators. To raise the bed 43 to the highest point, the pump 109 is operated, and water or other fluid is drawn from the tank and forced through the various pipes into the several cylinders. This will cause the pistons 42 to rise and lift the frame 43 and the bed 61 until the latter comes in contact with the small rolls 8$^a$. The pump, however, may continue to operate until the gage 122 indicates the amount of pressure intended to be given the bale. The check-valves 114, 116, and 118 prevent the fluid from being forced back to the inlet-pipe 112. The relief-valve 124 on the escape-pipe 125 is weighted to open at the pressure indicated by the gage 122.

The machine being put into operation and the material collecting between the bed 61 and the small rolls 8$^a$, the bed will be forced downwardly, driving the fluid from the several cylinders through the escape-pipes 119, 120, and 121 and past the relief-valve 124 on the pipe 125 of the tank. The relief-valve 124, as mentioned, is so set as to retain the pressure within the cylinders and allow the fluid to escape therefrom only when the pressure within the cylinders increases by reason of the layers of material being laid between the bed 61 and the small rolls 8$^a$.

As the frame 43 rises and falls it is necessary to provide compensating means for adjusting the length of the belt 90. For this purpose an idler 93 is journaled on the upper end of the arm 94, over which idler the belt 90 passes. Projecting inwardly from this arm 94 is a pin 94$^a$, forming a continuation of the journal of the roller 93, which pin travels in a groove 126, formed in a plate 127, secured to the end 11 of the main frame 8. As the frame 43 rises and falls the bell-crank lever carrying the roller 93 moves with it, and the pin 94$^a$, traveling in the slot 126, vibrates the lever 94 and allows the belt 90 to lengthen as the frame is lowered and to take up the slack from the said belt when the frame rises. It will be understood that this arrangement is the same on both sides of the machine.

The shafts 37 38, which carry the blades 39, are driven from the primary compressing-rolls by a system of pulleys and belting. (Shown in Figs. 1, 2, and 3.) The pulleys 130 131 are mounted loosely upon their respective shafts, being adapted to be connected thereto by a clutch 132 on each side of the machine, Fig. 6. The clutches 132, which engage the pulleys 130 131, are operated by a single lever 133, pivoted to the frame of the machine, from which lever a link connection 134, pivoted to the lever 133 on opposite sides of its pivotal point, connects with bars 135, extending across the frame one on each side of the casing 36, where they are pivoted, as shown in Fig. 6. An arm 136, connected to each bar 135, extends outwardly from near the central point of the bar and engages the clutch 132 on that side of the machine. The single lever 133 is moved by suitable means in one direction to cause the clutch members at each side to engage the pulleys 130 131 for the purpose of rotating the shafts 37 38. When the lever 133 has been disengaged, a spring 137 acts to withdraw the clutches from their connection with the said pulleys, thus stopping the rotation of the shafts 37 38 and at the same time the feed of the material to the primary compressing-rolls.

For the purpose of automatically unclutching the pulleys, and thus stopping the feed of material, I connect to the lever 133 a cord or chain 138, which passes over pulleys (indicated in dotted lines in Figs. 1 and 2) to a suitable trip mechanism, which at the proper time disengages a ring 138$^a$ on the end of the cord from its support and permits the spring 137 to operate the clutches. The trip mechanism is shown in Figs. 1, 2, 3, and 13, and consists of a bracket 139, bolted to the column 108, to the under surface of which bracket a lever 140 is pivoted, one arm of which extends forward above a pin 141, projecting from the side of the column 108, its opposite end extending rearwardly and engaging one end of a lever 142, whose opposite end is provided with a socket carrying a trip 142$^a$. As the material gathers on the bed 61 it (the bed) gradually lowers until a sufficient quantity has been collected thereon to form a bale, at which time a stop on the bed engages the trip 142$^a$ and rocks the levers 142 and 140 in such direction that the forward arm of the lever 140 is moved outwardly from the column 108. This disengages the ring 138$^a$, attached to the end of the cord 138, from the pin 141, over which it has been placed, thereby releasing the series of clutches 132.

A belt-shifter 143, adapted to slide on a rod 144 above the pulleys 79 80 on the main driving-shaft 76, has connected thereto a cord or chain 145 for throwing the main driving-belt into engagement with the fixed pulley 80, a spring 146 being provided for shifting the belt to the loose pulley 79. The cord or chain 145 passes over suitable pulleys, as shown in dotted lines in Fig. 1, to the opposite side of the column 108, to which the ring 138$^a$ of the cord 138 is attached. To the end of the cord 145 is secured a ring 145$^a$, hooked over a pin 147. A tripping device similar to that for operating the clutch 142 is used for tripping the belt-shifter 143.

Having described my invention, I claim—

1. In a compressing-machine, the combination of the main frame, rollers as 8$^a$ journaled therein, a rocking frame fulcrumed on the main frame, pressure-rolls journaled in the rocking frame, a vertically-moving bed-supporting frame below the main frame, and a horizontally-reciprocating bed carried by the bed-supporting frame, substantially as set forth.

2. In a compressing-machine, the combination of the main frame, rollers 8$^a$ journaled therein, a rocking frame fulcrumed on the main frame, pressure-rolls journaled in the rocking frame, other pressure-rolls journaled on the main frame above the rocking frame, a device for compacting and feeding fibrous substances to the compression-rolls, a vertically-moving bed-supporting frame below the main frame, and a reciprocating bed carried by the bed-supporting frame, substantially as set forth.

3. The combination of the main frame having rollers as 8$^a$ journaled therein, a rocking frame fulcrumed on the main frame and carrying pressure-rolls, a reciprocating bed below the main frame, a vertically-moving bed-supporting frame, hydraulic elevators for operating said frame and pressure-regulating devices for maintaining a constant pressure in the elevator-cylinders during the formation of a bale, substantially as set forth.

4. In a compressing-machine, the combination of the main frame, a pair of pressure-rolls journaled in a rocking frame fulcrumed on the main frame, other pressure-rolls journaled on the main frame, rotating blades for feeding fibrous material to the pressure-rolls, a reciprocating bed beneath the main frame, a vertically-moving bed-supporting frame adapted to be forced downwardly as the quantity of material laid on the bed increases, means for increasing the pressure, and means for reciprocating the bed, substantially as set forth.

5. In a compressing-machine, the combination of the main frame, pressure-rolls mounted transversely on the said frame, rollers 8$^a$ also mounted transversely in the main frame, a longitudinally-reciprocating bed disposed below the pressure-rolls and rollers 8$^a$, a vertically-moving bed-supporting frame, the bed and supporting-frame adapted to be forced away from the pressure-rolls and the rollers 8$^a$ as the quantity of material on the bed increases, and means for maintaining a constant upward pressure on the bed-supporting frame, substantially as set forth.

6. In a compressing-machine, the combination of a main frame, a pair of rolls mounted transversely on the central portion of said frame, a second pair of rolls disposed beneath the first pair and adapted to rock on the main frame, and a series of rollers as 8$^a$ journaled in the said frame, in combination with a bed-supporting frame movable in a vertical direction beneath the second pair of rolls and the rollers 8$^a$, a reciprocating bed carried by the bed-supporting frame, the bed and its supporting-frame being upheld by yielding supports and forced downwardly by the material collecting on the bed, substantially as set forth.

7. In combination with the main frame of a compressing-machine, a bed-supporting frame adapted to move in a vertical direction, a bed carried by the vertically-moving bed-supporting frame and adapted to reciprocate in a horizontal plane on said frame, and means on the bed-supporting frame for reciprocating the bed, substantially as set forth.

8. In a compressing-machine, the main frame, a rocking frame fulcrumed thereon, a pair of pressure-rolls journaled in the rocking frame, in combination with a bed-supporting frame adapted to move in a vertical direction, a bed carried by the bed-supporting frame and adapted to reciprocate in a horizontal plane thereon, and means for rocking the frame at the beginning of each reciprocation, substantially as set forth.

9. In a compressing-machine, the combination of the main frame, a rocking frame fulcrumed thereon, pressure-rolls journaled in the rocking frame, a sliding plate having inclines on its edge, the main driving-shaft, an eccentric thereon, and connections between the eccentric and the sliding plate for operating the latter, substantially as set forth.

10. In a compressing-machine, the combination of the main frame, a rocking frame fulcrumed thereon and carrying pressure-rolls, one of said rolls being adjustable, a vertically-moving bed-supporting frame beneath the pressure-rolls, a bed carried by the bed-supporting frame, and adapted to reciprocate thereon in a horizontal plane, means carried by the bed-supporting frame for reciprocating the bed, and means for tilting the rocking frame at the beginning of each reciprocation, substantially as set forth.

11. In a compressing-machine, the combination of the main frame, a rocking frame fulcrumed thereon and carrying pressure-rolls, a bed adapted to reciprocate in a horizontal plane below the main frame, a vertically-moving bed-supporting frame, the bed and its frame being forced downwardly by the material under pressure collecting on the bed, and means for normally forcing the bed-supporting frame upwardly, substantially as set forth.

12. In a compressing-machine, the combination with the feeding-blades fixed on rotating shafts, driving-pulleys on said shafts, clutches for connecting the pulleys to the shafts, a cord for operating the clutching mechanism to connect the shafts and pulleys, a spring or its equivalent for disengaging the clutches, a pin fixed to a stationary part of the machine, and a tripping device operated by the bed for disengaging the cord from the pin, substantially as set forth.

13. The combination with the supporting-columns, the main frame mounted thereon, the rocking frame pivotally supported on the main frame, the pressing-rolls journaled in the said rocking frame, the main driving-shaft and connections intermediate of said shafts and the rolls, whereby the rolls are alternately rocked up or down by the rotation of the main driving-shaft, a bed adapted to be reciprocated beneath the said compressing-rolls, a movable frame supporting the reciprocating bed, devices mounted on said moving frame and connected with the main driving-shaft for running the table back and forth, and counterbalance mechanism for said moving frame, substantially as set forth.

14. The combination of a supporting-column, the main frame held thereon, the pressing-rolls and the smaller or pressure-holding rolls mounted thereon, a movable frame, a counterbalancing mechanism connected therewith through the medium of the bars 44, a longitudinally-reciprocating bed adapted to travel on the movable frame, and a bagging-reel mounted on the supporting-columns at one end of the machine, substantially as set forth.

15. In a compressing-machine such as described, the combination with the transverse pressing-rolls, the moving frame arranged to travel vertically to and from the said compressing-rolls, a bed adapted to travel back and forth on the moving frame, stops 75, 75 on the bed, a rack on the bottom of said bed, a shaft 69 carrying pulleys 70, a second shaft 63 having thereon a fixed and two loose pulleys and a gear-wheel, the latter in engagement with the rack, a straight belt and a crossed belt, a belt-shifting device mounted on said moving frame and adapted to be alternately engaged by the stops 75, 75 to shift the belts and reverse the direction of motion of the gear-wheel, substantially as set forth.

16. In a compressing-machine such as described, in combination with the upright columns, a reciprocating bed operating longitudinally between the said columns and adapted to move in a vertical direction, a main driving-shaft carrying an eccentric, a main frame, a rocking frame pivotally supported on the central portion of the said main frame, second compressing-rolls journaled in the rocking frame, sliding plates adapted to operate on the shafts of the aforesaid rolls, and connections between the sliding plates and the eccentric, whereby said sliding plates will alternately raise and lower the second compressing-rolls into and out of contact with the bed, substantially as set forth.

17. In a compressing-machine, the combination with the supporting-columns, the main frame mounted thereon and carrying compressing-rolls and small rolls, a bagging-reel at one end of the machine, a longitudinally-disposed moving frame arranged to travel vertically between the columns, a bed mounted upon rollers pivoted to the moving frame and adapted to reciprocate upon the said frame, and formed with a series of transverse tie-openings in its upper face, substantially as set forth.

18. The combination with a longitudinally-reciprocating bed, its moving frame 43, the main frame, and the pressure-rolls mounted upon the moving frame, of the counterbalancing devices consisting of idlers secured to the bars 15, 15ª, the chains secured to the ends of bars 44 and passing over the said idlers, pulleys 49 hung in the loops of the pendent portions of the chains, counterweights and means for connecting the pulleys 49 with the counterweights, substantially as set forth.

19. In a compressing-machine, the combination with the moving frame, the reciprocating bed adapted to travel thereon, the shaft 63 journaled on the moving frame and provided with belt-pulleys and a gear connection between the said shaft and the bed, of a shaft 69 also mounted on the moving frame, the main driving-shaft 76, belt connections between the pulleys on the shafts 63 and 69, other belt connections between the main driving-shaft 76 and shaft 69, the latter belt connection passing over idlers pivoted to upright levers journaled to the main frame, and guides for directing the travel of the idlers as the moving frame rises and falls, substantially as set forth.

20. In a compressing-machine, the combination of a belt-shifting device for the main driving-belt, a cord or other means for operating the shifting device in one direction, a spring or its equivalent for moving the said device in the opposite direction, a pin fixed to a stationary part of the machine and a tripping device operated by the bed for disengaging the cord from the pin and stopping the machine when the bed reaches a predetermined position, substantially as set forth.

21. In a compressing-machine, the combination of the vertically-disposed columns, a frame 43 adapted to move in a vertical direction between said columns, a bed adapted to reciprocate on the said frame and partake of its vertical movement, hydraulic elevators for lifting and normally retaining in an elevated position the frame 43, and means for permitting the fluid to escape from the elevator-cylinders when the pressure therein exceeds a definite limit, substantially as set forth.

22. A compressing-machine having in combination a main frame, transversely-disposed pressure-rolls journaled therein, a reciprocating bed beneath the main frame, a frame 43 carrying the reciprocating bed, and adapted to be raised and lowered, and means for reciprocating the bed, substantially as set forth.

23. In a compressing-machine, the combination of the main frame, a vertically-movable frame 43, a bed supported by the said frame 43, and means for reciprocating the bed on the said frame 43 beneath the main frame, substantially as set forth.

24. In a compressing-machine, the combination of a main frame, pressure-rolls journaled therein, a series of rollers forming the under surface of the said main frame, a vertically-movable frame 43, a bed supported by said frame 43, counterbalance mechanism for the said frame 43, and means for reciprocating the bed, substantially as set forth.

In testimony whereof I have hereunto set my hand and seal this 14th day of April, 1898.

FRANCIS B. DEANE. [L. S.]

Witnesses:
F. W. WHITAKER,
JNO. A. FAULKNER.